(12) United States Patent
Poppe et al.

(10) Patent No.: US 7,772,320 B2
(45) Date of Patent: Aug. 10, 2010

(54) HIGH SCRATCH-RESISTANCE AND HIGH ELASTICITY COATING MATERIALS BASED ON ALKOXYSILANE FUNCTIONAL COMPONENTS

(75) Inventors: Andreas Poppe, Sendenhorst (DE); Guenter Klein, Muenster (DE); Andre Brosseit, Hamm (DE); Karin Wermelt, Muenster (DE); Martina Mollers, Drensteinfurt (DE)

(73) Assignee: BASF Corporation, Muenster (DE)

( * ) Notice: Subject to any disclaimer, the term of this patent is extended or adjusted under 35 U.S.C. 154(b) by 37 days.

(21) Appl. No.: 11/575,979

(22) PCT Filed: Sep. 3, 2005

(86) PCT No.: PCT/EP2005/009494

§ 371 (c)(1), (2), (4) Date: Mar. 26, 2007

(87) PCT Pub. No.: WO2006/042584

PCT Pub. Date: Apr. 27, 2006

(65) Prior Publication Data

US 2008/0047469 A1 Feb. 28, 2008

(30) Foreign Application Priority Data

Oct. 19, 2004 (DE) .................. 10 2004 050 746

(51) Int. Cl.
*C08L 83/00* (2006.01)
(52) U.S. Cl. .................. 524/506; 525/100; 525/102; 525/123; 428/447; 106/287.12; 106/287.13; 106/287.16; 106/287.17
(58) Field of Classification Search .................. 524/506
See application file for complete search history.

(56) References Cited

U.S. PATENT DOCUMENTS 4,640,868 A * 2/1987 Penn ................. 428/446
4,772,672 A * 9/1988 Isozaki et al. .............. 526/273
5,432,246 A * 7/1995 Fenn et al. .................. 528/28
5,516,559 A * 5/1996 Rockrath et al. ......... 427/407.1
5,985,463 A * 11/1999 Lin et al. ................... 428/447
6,288,198 B1 * 9/2001 Mechtel et al. ............. 528/28
2003/0027921 A1 * 2/2003 Speier et al. ................ 524/589
2004/0122183 A1 * 6/2004 Ho et al. .................. 525/329.7

FOREIGN PATENT DOCUMENTS

| EP | 0571073 B1 | 3/1993 |
|----|-----------|--------|
| EP | 0571073 A2 | 11/1993 |
| EP | 0571073 A2 * | 11/1993 |
| EP | 1273640 A2 | 1/2003 |

\* cited by examiner

*Primary Examiner*—David Wu
*Assistant Examiner*—Vu Nguyen
(74) *Attorney, Agent, or Firm*—Cantor Colburn LLP

(57) ABSTRACT

A thermosetting coating material comprising
(A) at least 50% by weight, based on the amount of nonvolatile substances in the coating material of (A1) from 0% to 50% by weight, based on the entirety of components (A1) and (A2), of a polymethacrylate copolymer containing more than 50% by weight, based on the entirety of comonomers in the copolymer (A1), of free-radically polymerizable, ethylenically unsaturated compounds (a1) containing at least one reactive group of the formula I $$—X—SiR''_x(OR')_{3-x} \quad (I)$$

and (A2) from 50% to 100% by weight, based on the entirety of components (A1) and (A2), of an adduct of polyisocyanate and alkoxysilane, (A2) containing at least one reactive group of the formula II:

$$—NR—C(O)—N—(X—SiR''_x(OR')_{3-x})_n(X'—SiR''_y(OR')_{3-y})_m \quad (II)$$

(B) a catalyst for the crosslinking of the $—Si(OR')_{3-x}$ units, and
(C) an aprotic solvent or a mixture of aprotic solvents.

13 Claims, No Drawings

HIGH SCRATCH-RESISTANCE AND HIGH ELASTICITY COATING MATERIALS BASED ON ALKOXYSILANE FUNCTIONAL COMPONENTS

This application is a National Phase Application of Patent Application PCT/EP2005/009494 filed on 3 Sep. 2005, which claims priority to DE102004050746.5, filed 19 Oct. 2004.

The present invention relates to thermally curable coating materials based on aprotic solvents and also based on alkoxysilane-functional components with high scratch resistance and high rubber-elasticity, which are suitable in particular for coating plastics.

Coating materials comprising binders based on poly(meth)acrylates which contain lateral and/or terminal alkoxysilane groups are known for example from patents and patent applications U.S. Pat. Nos. 4,043,953, 4,499,150, 4,499,151, EP-A-0 549 643 and WO-A-92/20643. The poly(meth)acrylates described there may include up to 70% by weight of comonomers containing alkoxysilane groups, based on all of the comonomers employed. The coating materials are cured with catalysis by Lewis acids and optionally in the presence of small amounts of water, with the formation of Si—O—Si networks. The coating materials are used inter alia as clearcoat materials. Although such clearcoats already exhibit high scratch resistance and a comparatively good weathering stability, they have deficiencies in rubber-elasticity which make it difficult to use them as heavy-duty clearcoat materials, in particular for plastics.

EP-A-0 267 698 describes solventborne coating materials whose binder constituents include (1) crosslinkable adducts containing alkoxysilane groups, obtainable by successively reacting polyisocyanates with hydroxyalkyl(meth)acrylates (Michael reaction) and then with amino-alkylalkoxysilanes, and (2) poly(meth)acrylates which contain lateral and/or terminal alkoxysilane groups. The readily accessible amine groups in the adducts, formed in the course of the Michael reaction, lead to a reduction in the water resistance of the cured coatings. Moreover, in the curing operation, these amine groups can react with the —Si(O-alkyl)$_3$ groups to form Si—N—C nodes, which are unstable to hydrolysis and lead to reduced chemicals resistance of the resultant coating. Coating materials of this kind also have deficiencies in terms of rubber-elasticity.

U.S. Pat. No. 4,598,131 describes solventborne coating materials comprising crosslinkable adducts containing alkoxy-silane groups, obtainable by successively reacting tetraalkyl orthosilicate with amino alcohols and then with polyisocyanates. As a result of their synthesis such adducts contain unwanted Si—O—C and/or Si—N—C nodes, which are unstable to hydrolysis and lead to a reduced chemicals resistance of the resultant coating. Moreover, coating materials of this kind also have deficiencies in terms of rubber-elasticity.

DE-A-102 37 270 embraces coating materials comprising crosslinkable adducts of isocyanatomethylalkoxysilanes and polyols. The isocyanatomethylalkoxysilanes used in the synthesis are highly toxic and therefore cannot be used without reservation in standard production processes.

EP-A-0 571 073 describes solventborne coating materials which include as binder constituents (1) crosslinkable adducts of polyisocyanates containing more than one tertiary isocyanate group and aminoalkylalkoxysilanes and (2) poly(meth)acrylates which contain lateral and/or terminal alkoxysilane groups. The resultant coatings, although of comparatively high scratch resistance, have a rubber-elasticity which is still inadequate, particularly in the case of heavy-duty, transparent applications to plastic substrates.

PROBLEM AND SOLUTION

The problem addressed by the present invention was to provide coating materials, preferably for heavy-duty clearcoat materials, in particular for plastic substrates, which in particular do not exhibit the elasticity deficiencies, in particular in terms of the rubber-elasticity, of the prior-art coatings.

The coatings ought in particular to have a high level of rubber-elasticity and scratch resistance and ought to exhibit a high level of transparency after scratching load. In particular the coatings of the invention ought to meet the requirements of the Taber test. The coatings and coating systems additionally ought to have a high degree of transparency and be stable to weathering. For the weathering stability it was necessary to ensure the possibility for effective incorporation of UV absorbers into the coating material of the invention. Moreover, the new coating materials ought to be preparable easily and with very high reproducibility, ought not to cause any environmental problems and ought to have good storage stability.

The invention accordingly provides thermosetting coating materials based on aprotic solvents and comprising (A) at least 50% by weight, based on the amount of nonvolatile substances in the coating material, of a mixture of (A1) from 0% to 50% by weight, based on the entirety of components (A1) and (A2), of a polymethacrylate copolymer containing more than 50% by weight, based on the entirety of comonomers in the copolymer (A1), of free-radically polymerizable, ethylenically unsaturated compounds (a1), containing at least one reactive group of the formula I

where

R'=hydrogen, alkyl or cycloalkyl, the carbon chain being uninterrupted or interrupted by nonadjacent oxygen, sulfur or NRa groups, where Ra=alkyl, cycloalkyl, aryl or aralkyl, X=linear and/or branched alkylene or cycloalkylene radical having 2 to 20 carbon atoms, R"=alkyl, cycloalkyl, aryl or aralkyl, the carbon chain being uninterrupted or interrupted by nonadjacent oxygen, sulfur or NRa groups, and X=0 to 2, and (A2) from 50% to 100% by weight, based on the entirety of components (A1) and (A2), of an adduct (A2) of at least one polyisocyanate and at least one alkoxysilane, (A2) containing at least one reactive group of the formula II:

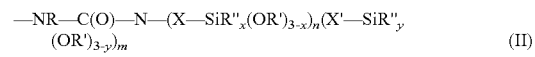

where X and R" represent the structural units described in formula I and where

R=hydrogen, alkyl, cycloalkyl, aryl or aralkyl, the carbon chain being uninterrupted or interrupted by nonadjacent oxygen, sulfur or NRa groups, X"=linear and/or branched alkylene or cyclo-alkylene radical having 2 to 20 carbon atoms, Ra=alkyl, cycloalkyl, aryl or aralkyl, x=y=0 to 2, n0 to 2, m=0 to 2, m+n=2, (B) a catalyst for the crosslinking of the —Si(OR')$_{3-x}$ units, and (C) an aprotic solvent or a mixture of aprotic solvents.

In the light of the prior it was surprising and unforeseeable for the skilled worker that the problems on whose addressing the present invention is based would be solved by means of the coating material of the invention.

Component (A) of the invention can be prepared with particular simplicity and causes no significant toxicological or environmental problems in the course of coating-material application.

The coating materials of the invention can be prepared with very high reproducibility and when used in the liquid state were adjustable to solids contents >40% by weight, preferably >45% by weight, in particular >50% by weight, without detriment to their very good transport properties, storage stability and processing properties, particularly their application properties. Additionally the coating materials of the invention exhibit the possibility of effective incorporation of UV absorber, especially hydrophobic UV absorber.

The coating materials of the invention provide new coatings and coating systems, especially clearcoats, which are of high scratch resistance and high elasticity. The transparency, especially the haze, of the coatings, especially after subjection to a load, is excellent. The coatings and coating systems of the invention, especially the clearcoats, can be used in particular for coating plastics. They are distinguished by a particularly high scratch resistance in the Taber test.

DESCRIPTION OF THE INVENTION

Component (A) of the Coating Material

Component (A) of the coating material of the invention contains at least 50% by weight, based on the nonvolatile substances in the coating material, of component (A1), from 0% to 50%, preferably from 0% to 45%, more preferably from 0% to 40% by weight, based on the entirety of components (A1) and (A2), of a polymethacrylate copolymer containing more than 50% by weight, based on the entirety of comonomers in the copolymer (A1), of free-radically polymerizable, ethylenically unsaturated compounds (a1), and (A2) from 50% to 100%, preferably from 55% to 100%, more preferably from 60% to 100% by weight, based on the entirety of components (A1) and (A2), of an adduct of polyisocyanate and alkoxysilane.

Component (A1) of the coating material is a polymethacrylate copolymer containing more than 50%, preferably more than 55%, more preferably more than 60% by weight, based on the entirety of comonomers in the copolymer (A1), of free-radically polymerizable, ethylenically unsaturated compounds (a1) containing at least one reactive group of the formula I —X—SiR"$_x$(OR')$_{3-x}$ (I)

where

R'=hydrogen, alkyl or cycloalkyl, the carbon chain being uninterrupted or interrupted by nonadjacent oxygen, sulfur or NRa groups, where Ra=alkyl, cycloalkyl, aryl or aralkyl, R' preferably being alkyl of 1 to 6 carbon atoms, more preferably methyl and/or ethyl, X=linear and/or branched alkylene or cycloalkylene radical having 2 to 20 carbon atoms, X being preferably alkylene of 2 to 6 carbon atoms, more preferably alkylene of 2 to 4 carbon atoms, R"=alkyl, cycloalkyl, aryl or aralkyl, the carbon chain being uninterrupted or interrupted by nonadjacent oxygen, sulfur or NRa groups, R" preferably being alkyl of 1 to 6 carbon atoms, more preferably methyl and/or ethyl, and x=0 to 2, preferably x=0.

Particularly preferred compounds (A1) are described for example in EP-B1-0 549 643 (page 3 line 47 to page 4 line 34). Especially preferred compounds (a1) are acrylates and/or methacrylates containing reactive groups (I), such as gamma-acryloyloxypropyltrimethoxysilane, acryloyloxymethyltrimethoxysilane, methacryloyloxymethyltrimethoxysilane or, in particular, gamma-methacryloyloxypropyltrimethoxysilane.

The free-radically polymerizable, ethylenically unsaturated comonomer units (a2) present in the copolymer (A1) in fractions of <50% by weight, preferably <45% by weight, more preferably less than <40% by weight, based on the entirety of the comonomers, are free-radically polymerizable, ethylenically unsaturated compounds, preferably acrylates and/or methacrylates, optionally alkyl, cycloalkyl, aryl and/or aralkyl esters of acrylic acid and/or methacrylic acid which carry further reactive functional groups (f) different from the reactive groups of the formulae I and II. The reactive functional groups (f) may be radiation-crosslinking and/or thermally crosslinking groups that are known per se, such as vinyl, (meth)acryloyl or allyl groups as radiation-crosslinking groups, for example, and thermally crosslinking groups, such as epoxy, isocyanate, carbamate and/or substituted amino groups, for example. The reactive functional groups (f) are preferably selected such that the curing of the coating materials is not accompanied, or is accompanied only to a very small extent, by the formation of Si—N—C and/or Si—O—C nodes that are unstable to hydrolysis. Particularly preferred compounds (a2) are alkyl and/or cycloalkyl esters of (meth)acrylic acid having 1 to 10 carbon atoms.

The compound (A2) has at least one reactive group of the formula II:

—NR—C(O)—N—(X—SiR"$_x$(OR')$_{3-x}$)$_n$(X'—SiR"$_y$(OR')$_{3-y}$)$_m$ (II)

where

R=hydrogen, alkyl, cycloalkyl, aryl or aralkyl, the carbon chain being uninterrupted or interrupted by nonadjacent oxygen, sulfur or NRa groups, with Ra=alkyl, cycloalkyl, aryl or aralkyl, R'=hydrogen, alkyl or cycloalkyl, the carbon chain being uninterrupted or interrupted by nonadjacent oxygen, sulfur or NRa groups, R' preferably being alkyl of 1 to 6 carbon atoms, more preferably methyl and/or ethyl, X, X'=linear and/or branched alkylene or cycloalkylene radical of 2 to 20 carbon atoms, X, X' preferably being alkylene of 2 to 6 carbon atoms, more preferably alkylene of 2 to 4 carbon atoms, R"=alkyl, cycloalkyl, aryl or aralkyl, the carbon chain being uninterrupted or interrupted by nonadjacent oxygen, sulfur or NRa groups, R" preferably being alkyl of 1 to 6 carbon atoms, more preferably methyl and/or ethyl, n=0 to 2, m=0 to 2, m+n=2, and x, y=0 to 2, preferably x=0.

Component (A2) containing the reactive groups of the formula II is preferably prepared by reacting at least one di- and/or polyisocyanates (PI) with at least one aminodisilane of the formula III:

HN—(X—SiR''$_x$(OR')$_{3-x}$)$_n$(X'—SiR''$_y$(OR')$_{3-y}$)$_m$ (III)

the substituents and indices being as defined above.

Particularly preferred aminodisilanes (III) are bis(2-ethyl-trimethoxysilyl)amine, bis(3-propyl-trimethoxysilyl)amine, bis(4-butyltrimethoxysilyl)-amine, bis(2-ethyltriethoxysilyl) amine, bis(3-propyl-trimethoxysilyl)amine and/or bis(4-butyltriethoxy-silyl)amine. Especially preferred is bis(3-propyltrimethoxy-silyl)amine.

Aminosilanes of this kind are available for example under the brand name SILQuest® from OSI.

Preferred di- and/or polyisocyanates PI for preparing component (A2) are conventional substituted or unsubstituted aromatic, aliphatic, cycloaliphatic and/or heterocyclic polyisocyanates. Examples of preferred polyisocyanates are: toluene 2,4-diisocyanate, toluene 2,6-diisocyanate, diphenylmethane 4,4'-diisoyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, dodecane 1,12-di-isocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Further-preferred polyisocyanates are the biuret dimers and the isocyanurate trimers of the aforementioned diisocyanates. Particularly preferred polyisocyanates PI are hexamethylene 1,6-diisocyanate, isophorone diisocyanate and 4,4'-methylenedicyclohexyl diisocyanate, their biuret dimers and/or isocyanurate trimers.

In a further embodiment of the invention the polyisocyanates PI are polyisocyanate prepolymers having urethane structural units, which are obtained by reacting polyols with a stoichiometric excess of the aforementioned polyisocyanates. Polyisocyanate prepolymers of this kind are described for example in U.S. Pat. No. 4,598,131.

Especially preferred components (A2) are: reaction products of hexamethylene 1,6-diisocyanate and isophorone diisocyanate, and/or their isocyanurate trimers with bis(3-propyltrimethoxysilyl)amine. The polyisocyanates are reacted with the aminosilanes preferably in an inert gas atmosphere at temperatures of not more than 100° C., preferably not more than 60° C. The resulting component (2) includes, in accordance with the invention, at least one structural unit of the aforementioned formula (II); in accordance with the preparation method preferred in accordance with the invention preferably at least 90 mol % of the isocyanate groups of the polyisocyanate PI have undergone reaction with the aminodisilanes (III), more preferably at least 95 mol %, to form structural units (II).

The fraction of components (A1) and (A2) in the coating material of the invention amounts to at least 50% by weight, based on the amount of nonvolatile substances in the coating material, preferably at least 60% by weight, more preferably at least 70% by weight.

The Further Components of the Coating Material

As catalysts (B) for crosslinking the —Si(OR')$_{3-x(y)}$ units it is possible to use conventional compounds. Examples are Lewis acids (electron deficiency compounds), such as, for example, tin naphthenate, tin benzoate, tin octoate, tin butyrate, dibutyltin dilaurate, dibutyltin diacetate, dibutyltin oxide, lead octoate. Catalysts used are preferably metal complexes with chelate ligands. The compounds which form chelate ligands are organic compounds containing at least two functional group which are able to coordinate to metal atoms or metal ions. These functional groups are normally electron donors, which give up electrons to metal atoms or metal ions as electron acceptors. Suitable organic compounds are in principle all those of the stated type, provided they do not adversely affect, let alone entirely prevent, the crosslinking of the curable compositions of the invention to cured compositions of the invention. Catalysts which can be used include, for example, the aluminum and zirconium chelate complexes as described for example in the U.S. Pat. No. 4,772,672 A, column 8 line 1 to column 9 line 49. Particular preference is given to aluminum, zirconium, titanium and/or boron chelates, such as aluminum ethyl acetoacetate and/or zirconium ethyl acetoacetate. Especially preferred are aluminum chelates.

Particular preference extends to aluminum, zirconium, titanium and/or boron alkoxides and/or esters.

Also of particular preference as component (B) are nanoparticles. Such nanoparticles are preferably incorporated into the nodes at least partly during the crosslinking of the —Si(OR')$_{3-x(y)}$ units.

The nanoparticles are preferably selected from the group consisting of metals and metal compounds, preferably metal compounds.

The metals are preferably selected from main groups three and four and transition groups three to six and one and two of the Periodic Table of the Elements and also the lanthanoids, and preferably from the group consisting of boron, aluminum, gallium, silicon, germanium, tin, zinc, titanium, zirconium, hafnium, vanadium, niobium, tantalum, molybdenum, tungsten and cerium. Use is made in particular of aluminum, silicon, titanium and/or zirconium.

The metal compounds are preferably oxides, oxide hydrates, sulfates, hydroxides or phosphates, especially oxides, oxide hydrates and hydroxides. Very particular preference is given to boehmite nano-particles.

The nanoparticles preferably have a primary particle size <50, more preferably 5 to 50, in particular 5 to 30 nm.

The catalyst component (B) is used preferably in fractions of from 0.01 to 30% by weight, more preferably in fractions of from 0.1 to 20% by weight, based on the nonvolatile constituents of the coating material of the invention.

Suitability as further component (C) is possessed by aprotic solvents, which in the coating material are chemically inert toward components (A) and (B) and also do not react with (A) and (B) when the coating material is cured. Examples of such solvents are aliphatic and/or aromatic hydrocarbons, such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl epoxypropionate, ethers, or mixtures of the aforementioned solvents. The solvents or solvent mixtures preferably have a water content of not more than 1% by weight, more preferably not more than 0.5% by weight, based on the solvent. In one preferred embodiment of the invention a mixture of components (A) and (C) is prepared first of all and in a further step is mixed with the remaining components of the coating material of the invention.

The coating material of the invention may further comprise at least one customary and known coatings additive in effective amounts, i.e., in amounts preferably up to 30% by weight, more preferably up to 25% by weight and in particular up to 20% by weight, based in each case on the nonvolatile constituents of the coating material.

Examples of suitable coatings additives are:

in particular, UV absorbers;

in particular, light stabilizers such as HALS compounds, benzotriazoles or oxalanilides;

free-radical scavengers;

slip additives;

polymerization inhibitors;

defoamers;

reactive diluents, such as are general knowledge from the prior art, which preferably do not react with the —Si(OR')$_3$ groups of component (A) with the formation of —Si—O—C and/or —Si—N—C nodes;

wetting agents such as siloxanes, fluorine compounds, carboxylic hemiesters, phosphoric esters, polyacrylic acids and copolymers thereof or polyurethanes;

adhesion promoters such as tricyclodecanedimethanol;

leveling agents;

film-forming auxiliaries such as cellulose derivatives;

fillers other than component (B), such as nanoparticles based on silica, alumina or zirconium oxide; for further details refer to Römpp Lexikon "Lacke und Druckfarben", George Thieme Verlag, Stuttgart, 1998, pages 250 to 252;

rheology control additives such as those from patents WO 94/22968, EP-A-0 276 501, EP-A-0 249 201 or WO 97/12945; crosslinked polymeric micro-particles, as disclosed for example in EP-A-0 008 127; inorganic phyllosilicates such as aluminum magnesium silicates, sodium magnesium and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates;

and/or flame retardants.

In a further embodiment of the invention the coating material of the invention may further comprise additional pigments and/or fillers and be used for producing pigmented topcoats. The pigments and/or fillers employed for this purpose are known to the skilled worker.

The coating materials of the invention can be applied by any of the customary application methods, such as spraying, knife coating, brushing, flow coating, dipping, impregnating, trickling or rolling, for example. The substrate to be coated may itself be stationary, with the application equipment or unit being in motion. Alternatively the substrate to be coated, especially a coil, may be in motion, with the application unit being stationary relative to the substrate or being in appropriate motion.

It is preferred to employ spray application methods, such as compressed-air spraying, airless spraying, high-speed rotation, or electrostatic spray application (ESTA), in conjunction where appropriate with hot spray application such as hot-air spraying, for example.

Curing of the applied coating materials of the invention may take place after a certain rest time. This rest time is used, for example, for the leveling and degassing of the coating films or for the evaporation of volatile constituents such as solvents. The rest time may be assisted and/or shortened by application of elevated temperatures and/or by a reduced air humidity, provided that this does not entail any damage or change to the coating films, such as premature complete crosslinking.

The thermal curing of the coating materials has no particular features as far as its method is concerned, but instead takes place in accordance with the conventional methods such as heating in a forced-air oven or exposure to IR lamps. Thermal curing may also take place in stages. Another preferred curing method is that of curing with near infrared (NIR) radiation. Thermal curing takes place advantageously at a temperature of 50 to 160° C., more preferably 60 to 150° C. and in particular 80 to 140° C., for a time of 1 min to 5 h, more preferably 2 min to 2 h and in particular 3 min to 90 min.

The coating materials of the invention provide new cured coatings, especially coating systems, especially clearcoats, moldings, especially optical moldings, and self-supporting sheets which are of high scratch resistance and in particular possess chemical stability and weathering stability. The coatings and coating systems of the invention, especially the clearcoats, can also be produced in particular in coat thicknesses >40 μm without incidence of stress cracks.

The coating materials of the invention are outstandingly suitable for use as decorative, protective and/or effect-providing coatings and coating systems, possessing high scratch resistance and high elasticity, on bodies of means of transport (especially motor vehicles, such as motorcycles, buses, trucks or automobiles) or parts thereof; on constructions, interior and exterior; on furniture, windows and doors; on plastics moldings, especially CDs and windows; on small industrial parts, on coils, containers, and packaging; on white goods; on sheets; on optical, electrical and mechanical components, and on hollow glassware and articles of everyday use.

The coating materials and coating systems of the invention, especially the clearcoats, are employed particularly for coating preferably transparent plastics.

Particular qualities which are manifested here include a particularly high chemicals resistance and weathering stability, a high level of transparency and also a very good scratch resistance, as demonstrated by means of the practically oriented Taber test.

EXAMPLES

Preparation Example 1

Preparation of a Suitable Catalyst (Component (B))

In order to ensure sufficient curing of the clearcoat material a suitable catalyst is prepared first of all. For that purpose 13.01 parts by weight of ethyl acetoacetate are added slowly at room temperature to 20.43 parts by weight of aluminum sec-butoxide in a round-bottomed flask, with stirring and cooling during the addition. Thereafter the reaction mixture is stirred further at room temperature for 1 h.

Preparation Example 2

Preparation of the Polyacrylate (A1a)

A three-necked flask of glass equipped with a reflux condenser and a thermometer is charged with 39.42 parts by weight of solvent naphtha, which is heated to 145° C. under a nitrogen atmosphere. At constant temperature, simultaneously, a mixture of 14.04 parts by weight of n-butyl methacrylate and 73.54 parts by weight of 3-methacryloyloxypropyltrimethoxylsiloxane is metered in at a uniform rate over the course of 2 hours and the initiator solution, consisting of 10.28 parts by weight of tert-butyl peroxy-2-ethylhexanoate in 12.72 parts by weight of solvent naphtha, is metered in at a uniform rate over the course of 5 hours. After the end of the addition of the initiator solution the temperature is held at 145° C. for 1.5 hours. This is followed by cooling to room temperature. Complete conversion was investigated by GC and the molecular weight was investigated by means of GPC. The result was a residue monomer content of 0.2% by weight in total (0.1% by weight n-butylmethacrylate, 0.1% by weight 3-methacryloyloxypropyltrimethoxylsiloxane), a mass-average molecular weight $M_w$ of 17,553 daltons and a number-average molecular weight of 2,175 daltons.

In further preparation examples (A1b) to (A1f) the n-butyl methacrylate monomer unit is replaced by ethyl acrylate, n-butyl acrylate, methyl methacrylate and cyclohexyl methacrylate, the preparation taking place as described above.

Preparation Example 3.1

Preparation of a Silanized Diisocyanate (IPDI) (Component (A2a))

A three-necked glass flask equipped with a reflux condenser, a thermometer and a feed facility is charged with 20.72 parts by weight of Desmodur I (IPDI, ®Bayer) and 15.61 parts by weight of Hydrosol A 170 (®Aral), this initial charge being stirred and blanketed with nitrogen. At 5° C. the feed, consisting of 63.66 parts by weight of bis(trimethoxysilylpropyl)amine (available commercially as Silquest A1170 from OSI) is then added in metered form over 1.5 hours at a rate such that the temperature, as a result of the exothermic reaction, does not exceed 10° C.

The mixture obtained in this way was stirred at room temperature for 12 hours and then at 60° C. until free NCO groups were no longer detectable by means of a titrimetric determination of NCO value.

Preparation Example 3.2

Preparation of a Silanized Diisocyanate (HDI) (Component (A2b))

A three-necked glass flask equipped with a reflux condenser, a thermometer and a feed facility is charged with 17.8 parts by weight of Desmodur H (HDI, ®Bayer) and 10.0 parts by weight of Hydrosol A 170 (®Aral), this initial charge being stirred and blanketed with nitrogen. At 0° C. the feed, consisting of 72.2 parts by weight of bis(trimethoxysilylpropyl)amine (available commercially as Silquest A1170 from OSI) is then added in metered form over 1.5 hours at a rate such that the temperature, as a result of the exothermic reaction, does not exceed 10° C.

The mixture obtained in this way was stirred at room temperature for 12 hours and then at 60° C. until free NCO groups were no longer detectable by means of a titrimetric determination of NCO value.

Comparative Example

Preparation of a Silanized Diisocyanate (HDI) with Monofunctional Silane Amine A three-necked glass flask equipped with a reflux condenser, a thermometer and a feed facility is charged with 17.8 parts by weight of Desmodur H (HDI, ®Bayer) and 10.0 parts by weight of Hydrosol A 170 (®Aral), this initial charge being stirred and blanketed with nitrogen. At 0° C. the feed, consisting of 48.05 parts by weight of (N-phenylaminomethyl)trimethoxysilane (available commercially as Geniosil XL973 from Wacker), is added dropwise and then added in metered form over 1.5 hours at a rate such that the temperature, as a result of the exothermic reaction, does not exceed 10° C.

The mixture obtained in this way was stirred at room temperature for 12 hours and then at 60° C. until free NCO groups were no longer detectable by means of a titrimetric determination of NCO value.

Formulation of Scratch-Resistant and Chemicals-Resistant Coating Materials

To formulate highly scratch-resistant and chemicals-resistant coating materials the diisocyanate adducts (A2a) and (A2b) described in Preparation Examples 3.1 and 3.2 were admixed with the polyacrylates (A1a) to (A1f) with alkoxysilane functionality, described under Preparation Example 2, in an (A1):(A2) weight ratio of 25:75, or used as unmixed components and admixed with the catalyst (B) described in Preparation Example 1. The resulting coating materials were applied and baked at 130° C. for 30 minutes. The associated formulas (parts by weight) are based on the composition of coating material, and results are compiled in Table 1.

TABLE 1

Preparation of chemicals-resistance, high-scratch-resistance coatings 1a to 1h with the coating materials of the invention (numerical data in parts by weight) and the Comparative Example C

| | 1a | 1b | 1c | 1d | 1e | 1f | 1g | 1h | C |
|---|---|---|---|---|---|---|---|---|---|
| Component (A1a): with n-butyl methacrylate | 25 | 0 | 0 | 0 | 0 | 0 | 0 | 0 | 0 |
| Component (A1b): with n-butyl acrylate | 0 | 25 | 0 | 0 | 0 | 0 | 0 | 0 | 0 |
| Component (A1c): with ethyl acrylate | 0 | 0 | 25 | 25 | 0 | 0 | 0 | 0 | 0 |
| Component (A1d): with methyl methacrylate | 0 | 0 | 0 | 0 | 25 | 0 | 0 | 0 | 0 |
| Component (A1e): with cyclohexyl methacrylate | 0 | 0 | 0 | 0 | 0 | 25 | 0 | 0 | 0 |
| Component (A2a): with IPDI | 0 | 0 | 0 | 75 | 75 | 75 | 100 | 0 | 0 |
| Component (A2b): with HDI | 75 | 75 | 75 | 0 | 0 | 0 | 0 | 100 | 0 |
| Component as per Comparative Example | 0 | 0 | 0 | 0 | 0 | 0 | 0 | 0 | 100 |
| Component (B) | 10 | 10 | 10 | 10 | 10 | 10 | 10 | 10 | 10 |

TABLE 2

Properties of the coatings produced with the coating materials of the invention

| | 1a | 1b | 1c | 1d | 1e | 1f | 1g | 1h | C |
|---|---|---|---|---|---|---|---|---|---|
| Scratch resistance in the Taber test | 1 | 1 | 1 | 3 | 2 | 3 | 1 | 1 | 3 |
| Haze after subjection to load in the Taber test | 8 | 20 | 25 | 45 | 21 | 29 | 3 | 4 | 53 |
| BART test | | | | | | | | | |
| $H_2SO_4$ 10% strength | 0 | 0 | 0 | 1 | 0 | 0 | 1 | 1 | 5 |
| $H_2SO_4$ 36% strength | 0 | 0 | 0 | 0 | 0 | 0 | 0 | 0 | 5 |
| HCl 10% strength | 2 | 0 | 2 | 1 | 1 | 1 | 1 | 1 | 5 |

TABLE 2-continued

Properties of the coatings produced with the coating materials of the invention

| | 1a | 1b | 1c | 1d | 1e | 1f | 1g | 1h | C |
|---|---|---|---|---|---|---|---|---|---|
| H₂SO₃ 6% strength | 0 | 0 | 0 | 1 | 0 | 0 | 0 | 0 | 5 |
| NaOH 5% strength | 0 | 2 | 1 | 1 | 1 | 1 | 0 | 0 | 2 |
| DI water | 0 | 0 | 0 | 0 | 0 | 0 | 0 | 0 | 0 |

The scratch resistance of the surfaces of the resulting coatings 1a to 1h were investigated by means of the Taber test. The same procedure was adapted with the diisocyanate adduct described in the comparative example (Comparative Example 1) (coating C). The Taber test was conducted in accordance with the wear test of DIN 52347 (1000 cycles, CS10F, 500 g) and afterward the haze of the damaged area was measured in accordance with DIN 5036. In this case, following application of the load, the areas under test were cleaned with a soft cloth to remove the residues of steel wool. The areas under test were evaluated visually under artificial light and rated as follows:

| Rating | Damage |
|---|---|
| 1 | none |
| 2 | little |
| 3 | slight |
| 4 | slight to moderate |
| 5 | severe |
| 6 | very severe |

Evaluation took place immediately after the end of the test.

The chemical resistance was investigated using the BART test. The BART (BASF ACID RESISTANCE TEST) was used to determine the resistance in the clearcoat to acids, alkalis and water drops. In this test the clearcoat was exposed to a temperature load in a gradient oven after baking at 40° C. for 30 minutes. Previously the test substances (10% and 36% strength sulfuric acid; 6% sulfurous acid, 10% strength hydrochloric acid; 5% strength sodium hydroxide solution, DI (i.e., fully demineralized or deionized) water—1, 2, 3 or 4 drops) had been applied in a defined manner using a volumetric pipette. After the substances had been allowed to act they were removed under running water and the damage was assessed visually after 24 h in accordance with a predetermined scale:

| Rating | Appearance |
|---|---|
| 0 | no defect |
| 1 | slight marking |
| 2 | marking/dulling/no softening |
| 3 | marking/dulling/color change/softening |
| 4 | cracks/incipient etching |
| 5 | clearcoat removed |

Each individual mark (spot) was evaluated and the result was reported in the form of a rating for each test substance.

What is claimed is:

1. A thermosetting one component, thermally curable, coating material comprising
(A) at least 50% by weight, based on the amount of nonvolatile substances in the coating material, of a mixture of
(A1) from 25% to 50% by weight, based on the entirety of components (A1) and (A2), of a polymethacrylate copolymer comprising more than 50% by weight, based on the entirety of comonomers in the copolymer (A1), of free-radically polymerizable, ethylenically unsaturated compounds (a1), comprising at least one reactive group of the formula I

where
R' is a hydrogen, alkyl or cycloalkyl, the carbon chain being uninterrupted or interrupted by nonadjacent oxygen, sulfur or NRa groups, where Ra is an alkyl, cycloalkyl, aryl or aralkyl,
X is a linear and/or branched alkylene or cycloalkylene radical having 2 to 20 carbon atoms,
R" is an alkyl, cycloalkyl, aryl or aralkyl, the carbon chain being uninterrupted or interrupted by nonadjacent oxygen, sulfur or NRa groups, and
x=0 to 2;
and
(A2) from 50% to 75% by weight, based on the entirety of components (A1) and (A2), of an adduct (A2) of polyisocyanate and alkoxysilane, (A2) comprising at least one reactive group of the formula II:

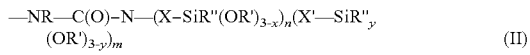

where X, R', and R" represent the structural units described in formula I and where
R is a hydrogen, alkyl, cycloalkyl, aryl or aralkyl, the carbon chain being uninterrupted or interrupted by nonadjacent oxygen, sulfur or NRa groups, where Ra is an alkyl, cycloalkyl, aryl or aralkyl,
X' is a linear and/or branched alkylene or cycloalkylene radical having 2 to 20 carbon atoms,
n=0 to 2,
m=0 to 2,
m+n=2,
x=y=0 to 2, and
wherein greater than 95 mol % of the isocyanate groups of the polyisocyanate have undergone reaction with the alkoxysilane;
(B) a catalyst for the crosslinking of the —SiR"$_x$(OR')$_{3-x}$ and —SiR"$_y$(OR')$_{3-y}$ units, and
(C) an aprotic solvent or a mixture of aprotic solvents, wherein the aprotic solvent (C) has a water content of not more than 1% by weight, based on the solvent.

2. The thermosetting one-component coating material of claim 1, wherein the compound (A1) comprises a polymethacrylate copolymer comprising greater than 60% by weight, based on the entirety of the comonomers in the copolymer (A1), of free-radically polymerizable, ethylenically unsaturated compounds (a1).

3. The thermosetting one-component coating material of claim 1, wherein X and/or X' is alkylene having 2 to 4 carbon atoms.

4. The thermosetting one-component coating material of claim 1, wherein the fraction of components (A1) and (A2), based on the amount of nonvolatile substances in the coating material, is at least 60% by weight.

5. The thermosetting one-component coating material of claim 1, wherein the catalyst (B) is selected from the group consisting of boron chelates, boron alkoxides, boron esters, aluminum chelates, aluminum alkoxides, aluminum esters, titanium chelates, titanium alkoxides, titanium esters, zirconium chelates, zirconium alkoxides, zirconium esters, nanoparticles of compounds of the elements aluminum, silicon, titanium or zirconium, and mixtures thereof.

6. The thermosetting one-component coating material of claim 1, wherein the aprotic solvent (C) has a water content of not more than 0.5% by weight, based on the solvent.

7. A method of coating a substrate comprising applying a film of the thermosetting one-component coating material of claim 1 to a plastic substrate, wherein the coating thickness is greater than 40 micrometers, and the coating is thermally cured at a temperature of 80 to 140° C.

8. A multistage coating process which comprises applying a film of the thermosetting one-component coating material of claim 1 to a substrate, wherein the substrate comprises a basecoat film.

9. The thermosetting one-component coating material of claim 5, wherein the catalyst (B) comprises from 0.1 to 20% by weight of the coating material based on the amount of the nonvolatile substances in the coating material.

10. The thermosetting one-component coating material of claim 1, wherein the a polymethacrylate copolymer (A1) comprises at least one of gamma-methacryloyloxypropyltrimethoxysilane, gamma-acryloyloxypropyltrimethoxysilane, methacryloyloxymethyltrimethoxysilane, acryloyloxymethyltrimethoxysilane, or a combination comprising at least one of the foregoing silanes, and wherein component (A2) is produced by reacting at least one of hexamethylene 1,6-diisocyanate, isophorone diisocyanate, 4,4'-methylenedicyclohexyl diisocyanate, biuret dimers thereof, isocyanurate trimers thereof, and polyisocyanate prepolymers obtained by reacting polyols with a stoichiometric excess of one of the aforementioned polyisocyanates, or a combination comprising at least one of the foregoing polyisocyanates, with an amino dialkoxysilane, and a catalyst (B).

11. The thermosetting one-component coating material of claim 1, wherein the catalyst is an aluminum chelate.

12. The thermosetting one-component coating material of claim 1, wherein the catalyst is selected from the group consisting of aluminum ethyl acetoacetate, zirconium ethyl acetoacetate, and combinations thereof.

13. The thermosetting one-component coating material of claim 1, wherein the polymethacrylate copolymer comprises greater than or equal to 84% by weight, based on the entirety of comonomers in the copolymer (A1), of free-radically polymerizable, ethylenically unsaturated compounds (a1), comprising at least one reactive group of the formula I $$-X-SiR''_x(OR')_{3-x} \qquad (I).$$

* * * * *